United States Patent
Han

(10) Patent No.: US 10,961,945 B1
(45) Date of Patent: Mar. 30, 2021

(54) FUEL INJECTION CONTROL APPARATUS AND METHOD FOR IMPROVING DEVIATION OF INJECTOR OPENING TIME

(71) Applicants: Hyundai Motor Company, Seoul (KR); Kia Motors Corporation, Seoul (KR)

(72) Inventor: Jung-Suk Han, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/899,298

(22) Filed: Jun. 11, 2020

(30) Foreign Application Priority Data

Feb. 17, 2020 (KR) .................. 10-2020-0018892

(51) Int. Cl.
| F02D 41/38 | (2006.01) |
| F02D 41/40 | (2006.01) |
| F02D 41/24 | (2006.01) |
| F02D 41/22 | (2006.01) |
| F02D 41/20 | (2006.01) |

(52) U.S. Cl.
CPC ........ F02D 41/3845 (2013.01); F02D 41/20 (2013.01); F02D 41/22 (2013.01); F02D 41/2441 (2013.01); F02D 41/402 (2013.01); F02D 2041/2017 (2013.01); F02D 2041/226 (2013.01); F02D 2041/227 (2013.01)

(58) Field of Classification Search
CPC .. F02D 41/3845; F02D 41/22; F02D 41/2441; F02D 41/402; F02D 41/20; F02D 2041/226; F02D 2041/227; F02D 2041/2017
See application file for complete search history.

(56) References Cited

U.S. PATENT DOCUMENTS

| 5,924,407 A * | 7/1999 | Iwaszkiewicz | F02D 41/20 123/41.31 |
| 2003/0062029 A1* | 4/2003 | Oyama | F02D 41/20 123/490 |
| 2009/0107469 A1* | 4/2009 | Takahashi | F02D 41/20 123/490 |
| 2015/0275814 A1 | 10/2015 | Park et al. | |
| 2020/0248642 A1* | 8/2020 | Yamamoto | F02D 41/3818 |

FOREIGN PATENT DOCUMENTS

| KR | 10-2015-0114078 A | 10/2015 |
| KR | 10-2016-0096491 A | 8/2016 |
| KR | 10-1684509 B1 | 12/2016 |

* cited by examiner

*Primary Examiner* — George C Jin
(74) *Attorney, Agent, or Firm* — Morgan, Lewis & Bockius LLP

(57) ABSTRACT

A fuel injection control method of injecting fuel to a combustion chamber of an engine through an injector, the method may include pre-energizing to drive the injector during a predetermined pre-energizing time; and performing, by the controller, a main injection in which the injector is controlled by the controller to inject the fuel into the combustion chamber by a target injection amount, after the pre-energizing of the injector, wherein the pre-energizing magnetizes an injector coil of the injector in advance by applying the amount of current preventing the flow rate of the fuel from being generated by the pre-energizing, to the injector during the pre-energizing time.

18 Claims, 9 Drawing Sheets ically applied for each injector to a point where the flow rate actually comes out. In the case of the deviation of the opening time, the deviation amount is relatively smaller than that of the deviation of the closing time, but is an important factor because it largely affects the flow rate in a section where the injection time is very short as in the aforementioned low flow rate section. Accordingly, it was conventionally important to determine the opening time and to control the deviation of the opening time based thereon.
FUEL INJECTION CONTROL APPARATUS AND METHOD FOR IMPROVING DEVIATION OF INJECTOR OPENING TIME

CROSS-REFERENCE TO RELATED APPLICATION

The present application claims priority to Korean Patent Application No. 10-2020-0018892, filed on Feb. 17, 2020, the entire contents of which is incorporated herein for all purposes by this reference.

BACKGROUND OF THE PRESENT INVENTION

Field of the Invention

The present invention relates to a fuel injection control apparatus and method, and more particularly, to a fuel injection control apparatus and method, which may improve the deviation of an injector opening time in the low flow rate section of fuel.

Description of Related Art

When fuel is supplied to an engine, the supplied fuel amount is determined by a controller (ECU), and the fuel is injected into the engine by an injector by the determined demand amount of fuel to be supplied into the engine.

FIG. 8 illustrates the conventional injector, and a needle valve 120b is formed inside a housing 120a of the injector 120, and an armature 120c, a coil 120d, a spring 120e, and the like for operating the needle valve 120b are formed therein. The needle valve 120b is repeatedly moved back and forth by the operation of the amateur 120c to block or open a nozzle 120f formed at the end portion of the housing 120a. That is, when a current is applied to the coil 120d, the armature 120c is operated to pull the needle valve 120b, and when the current is cut off, the needle valve 120b is formed to return to the original location by the elasticity of the spring 120e.

The injector is provided for each cylinder to receive a fuel injection signal from a controller to inject fuel during a predetermined injection time, supplying the fuel into the engine by the demand amount of fuel.

FIG. 4 is a diagram illustrating a drive waveform of the injector which is mounted to a conventional GDI engine. In a Boost Phase, which is a first phase of the fuel injection control, a relatively high current is applied to the coil 120d by use of a boost voltage. Furthermore, in a Pickup Phase, which is a subsequent second phase, the coil 120d is converted to have a battery voltage which is relatively lower than the boost voltage to provide the motion of the armature until reaching the maximum armature stroke. In a subsequent third phase (Holding Phase), the coil 120d is operated by relatively less additional current than that in the first and second phases.

However, as described even in Patent Document 1, the injector has a unique injector drive characteristic difference for each kind or company thereof. The injector closing demand time based on the demand amount of fuel relative to fuel pressure, or the injector closing demand time and the injection command time corresponding thereto have a specific correspondence relationship for each type or company of the injector. Such characteristic information is stored in a memory inside the controller when the vehicle is manufactured, and used to supply fuel into each cylinder by the demand amount of fuel.

However, even in the case of the same injector, the injector drive characteristics may vary due to a manufacturing tolerance, a tolerance of the output stage which operates the injector in the controller, and a difference between the operating current profiles thereby. When the deviation of the injector drive characteristics related to the injector opening time and closing time for each cylinder is not compensated, a deviation of the opening time and the closing time between the injectors occurs for each cylinder, and despite the injection command based on the same injection time, different amounts of fuel are supplied for each cylinder. That is, the same flow rate control between cylinders becomes difficult.

In recent years, the open sensing calculation of the injector in the GDI engine using high pressure becomes a problem. As the injection mode has multi-phases to reduce particulate matter or increase combustion efficiency, the injection time is rapidly reduced for each injection of the multi-phase injection. As illustrated in FIG. 7, the injection which utilizes a very small fuel amount injection section (A) (so-called ballistic section) in which the fuel amount (m) is rapidly increased even if an injector operating time ($T_i$) is slightly changed is also being performed.

The reason of determining the opening time of the injector is because, as described above, there is a deviation from after an injection signal is electr The information included in this Background of the Invention section is only for enhancement of understanding of the general background of the invention and may not be taken as an acknowledgement or any form of suggestion that this information forms the prior art already known to a person skilled in the art.

BRIEF SUMMARY

FIG. 6 is a graph illustrating the relationship between an injector opening duration, which is a duration in which the actual fuel is injected from the injector, the current applied to the injector, and the voltage generated from the injector. Referring to FIG. 6, the horizontal axis represents a time, and the vertical axis represents the magnitudes of the current and the voltage, and the fuel amount injected from the injector.

In FIG. 6, a section (a) means a dead stroke of the needle of the injector, and means a section in which the needle moves by the current applied to the injector but the actual fuel injection nozzle is not opened.

For the injector to inject fuel, the needle needs to be lifted, and to lift the needle, a current needs to be applied to a solenoid or piezo side to magnetize a coil. To apply the current, an initial signal is generated, a current is applied to the solenoid or piezo side of the injector at a constant delay time from the initial signal, and the magnitude of the current gradually increases, reaching a current peak, as illustrated in FIG. 6.

Furthermore, as illustrated in FIG. 6, the current has a route where the current is increased to reach a current peak point, and is decreased again, and at a time point at which a certain time has elapsed from the current peak (injector opening time point), the needle is lifted, and the needle is in a lifted state during the injector opening duration from the injector opening time point (state where the actual fuel is injected).

However, since there is no particular change in voltage or current at the opening time point of the injector, conventionally, a typical method could not sense the opening time of the injector accurately. Accordingly, the injector closing time point has been conventionally used to find the injector opening time. A time point when the closing time point is firstly generated by gradually increasing the fuel injection time from a very short time period has been determined as the opening time point, and the actual opening time has been determined by comparing the present value with that of each injector or a master injector.

Furthermore, the injector closing time is measured by use of a reverse voltage signal generated by the injector. As illustrated in FIG. 6, the voltage generated by the injector tends to increase and decrease rapidly at the initial stage where the current is applied to the injector, and then increase again. Furthermore, thereafter, the voltage suddenly decreases again at the time point at which the current application to the injector becomes OFF, and after a predetermined time delay (section (b), about 0.1 ms), the voltage rapidly increases again. As illustrated in FIG. 6, an inflection point exists in the voltage curve in the section where the voltage increases again (section (c)), and the time point at which the inflection point exists becomes a time point at which the needle of the injector is closed to terminate the fuel injection (injector closing time). Accordingly, when the time point at which the inflection point exists is detected by performing the secondary differentiation for the voltage curve, the injector closing time may be detected.

However, based on the characteristics of the injector, even though the injector is actually opened, there is a case where the inflection point is not clearly recognized. The inflection point is caused by the change in the speed of the needle when the needle of the injector goes downward and the injector is closed while the magnetization of the coil of the injector disappears. The present phenomenon appears to be in a signal at the low side and high side of the injector. That is, even if the needle of the injector is closed at the same height, the inflection point is more visible in the case of the injector with a fast injector closing speed. As described above, since the injector opening time is sensitive to the closing characteristic of the injector, the inflection point is not well distinguished in the injector having a poor closing characteristic or an uneven opening characteristic.

Accordingly, since it has been difficult to accurately detect the opening time of the injector, it has been difficult to perform the same flow rate control between cylinders by improving the deviation of the opening time based on the detected opening time.

Various aspects of the present invention are directed to providing a fuel injection method and apparatus, which may stably improve the performance of the injector by improving the deviation of the opening time for each cylinder even without detecting the opening time point for each cylinder.

Unlike the related art, the present invention magnetizes a magnetic coil of an injector in advance immediately before injecting fuel without directly determining and estimating the opening time point of the injector for improving the deviation of the opening time point, improving the deviation of the opening time point by facilitating the injector to be opened as fast as possible when the actual injection is performed. According to an exemplary embodiment of the present invention, it is possible to reduce a magnetization time of the coil which is a factor having the greatest effect on the opening time point of the injector, advancing the opening time point of the injector, and accordingly, reducing the deviation of the opening between the injectors.

A fuel injection control method according to an exemplary embodiment of the present invention for achieving the object, as the fuel injection control method which injects fuel to a combustion chamber of an engine through an injector, includes pre-energizing to drive the injector during a predetermined pre-energizing time; and performing, by the controller, a main injection in which the injector is controlled by the controller to inject the fuel into the combustion chamber by a target injection amount, after the pre-energizing of the injector, and the pre-energizing magnetizes an injector coil of the injector in advance by applying the amount of current preventing the flow rate of the fuel from being generated by the pre-energizing, to the injector during the pre-energizing time.

The pre-energizing determines the pre-energizing time and the amount of the current according to a fuel pressure and an engine temperature.

The pre-energizing determines whether the main injection is a single injection or a multi-phase injection, and converts a final injection time to a time obtained by summing an injection time of a present main injection and the pre-energizing time, when the main injection is determined as a single injection.

The method determines whether idle times between injections of the multi-phase injection exceed a predetermined value, when the main injection is determined as the multi-phase injection, and converts the injection time upon a first injection of the multi-phase injection to a time obtained by summing an injection time of the first injection upon the existing multi-phase injection and the pre-energizing time, when all the idle times between the injections of the multi-phase injection are the predetermined value or less.

Furthermore, the method converts the injection time of the corresponding injection to a time obtained by summing the existing injection time upon the corresponding injection and the pre-energizing time, in every first injection of the multi-phase injection and every injection after the idle time which exceeds the predetermined value, when at least any one of the idle times between the injections of the multi-phase injection exceeds the predetermined value.

The method determines whether a limp home mode, in which the fuel is injected in a forced low pressure mode, is being executed due to the malfunction of a high pressure pump of a fuel system, and stops the pre-energizing, when the controller determines that the limp home mode is being executed.

The pre-energizing is configured to increase the amount of the current applied to the injector by use of a boost voltage, upon the pre-energizing of the injector, and then to maintain the amount of the current applied to the injector up to the time point of the main injection by use of a battery voltage.

A fuel injection control apparatus according to an exemplary embodiment of the present invention for achieving the object is the fuel injection control apparatus including an injector which injects fuel to a cylinder; and a controller which controls the injector so that the fuel is injected from the injector into the cylinder by a target injection amount, and the controller is configured to perform a pre-energizing control in which an injector coil of the injector is magnetized by applying the amount of current having a predetermined magnitude to the injector during a predetermined pre-energizing time to prevent the flow rate of the fuel from being generated, before the main injection in which the target injection amount of the fuel is injected into the cylinder.

The controller includes a pre-energizing time and current amount calculator which determines the pre-energizing time and the amount of current, an injection mode calculator which determines the injection time of the injector based on the number of injection times, an injection time and an injection angle of the injector upon the main injection, and the result determined by the pre-energizing time and current amount calculator, and an injector drive semiconductor which controls the injector by forming current waveforms upon the pre-energizing and the main injection, respectively, according to a result determined by the injection mode calculator.

The pre-energizing time and current amount calculator determines the pre-energizing time and the amount of current according to a fuel pressure measured by a fuel rail pressure sensor and an engine temperature measured by a coolant sensor.

According to an exemplary embodiment of the present invention, it is possible to improve the deviation of the opening time between the standalone injectors even without detecting the injector opening time. Accordingly, even in the case where the injector opening time may not be stably determined because the injector closing time has been incorrectly determined, or the relationship between the injector closing time and the injector opening time may not be specified with respect to all injectors mounted to each of the plurality of cylinders, it is possible to improve the deviation of the injector opening time.

As a result, the initial flow rate development behavior of the injector may be improved, and the opening time point of the injector may be advanced, effectively performing the low flow rate control. Furthermore, even when the injection time is increased, the injector opening time point becomes constant, and the difference in the opening time points between the standalone injectors may be reduced, effectively performing the low flow rate control in the ballistic section.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
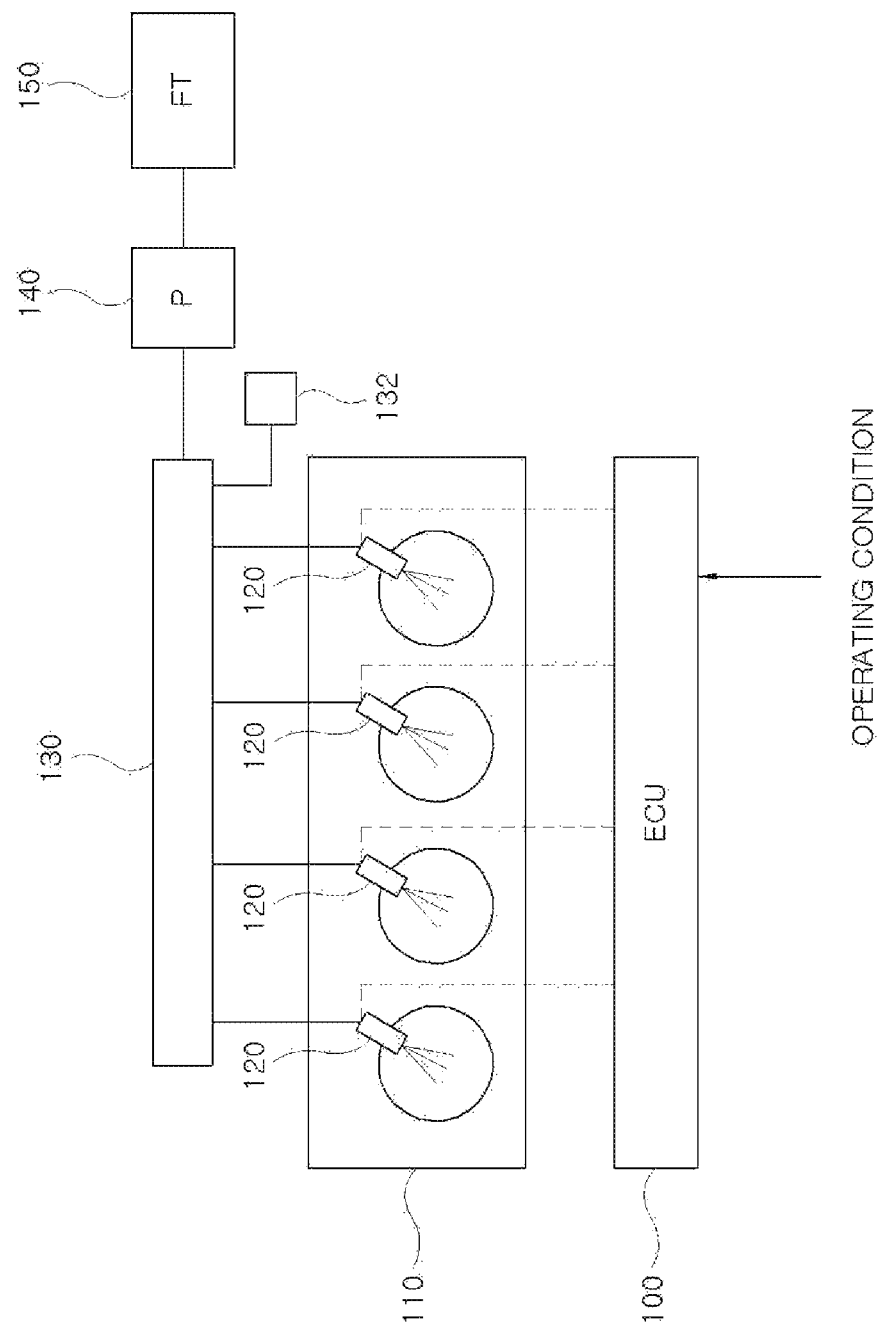
FIG. 1 is a schematic block diagram of a fuel injection system in which a fuel injection control method according to an exemplary embodiment of the present invention is performed.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a fuel injection control method and apparatus according to exemplary embodiments of the present invention will be described with reference to the accompanying drawings.

FIG. 1 is a schematic block diagram of a fuel injection system in which a fuel injection control method according to an exemplary embodiment of the present invention is performed.

Referring to FIG. 1, a control system of an injector includes a fuel tank 150, a fuel pump 140, a rail 130, a pressure sensor 132, an injector 120, an engine 110, and a controller 100.

The fuel tank 150 is filled with fuel used for an internal combustion engine, and the fuel pump 140 pumps the fuel contained in the fuel tank 150 to the rail. The pressure sensor 132 which detects the pressure inside the rail 130 is mounted, and a separate regulator valve and a return line are formed in the rail 130.

The fuel pumped to the common rail 130 is distributed to the injector 120, and the injector 120 is mounted corresponding to each cylinder to inject fuel into a combustion chamber of the engine 110.

The controller 100 may set the demand injection fuel amount based on the operation condition, for example, the RPM of the engine and the accelerator pedal signal, and control the injection command time of the injector in a response to the set demand injection fuel amount. Furthermore, the controller 100 is configured to perform a pre-energizing control in which an injector coil of the injector is magnetized by applying a current having a predetermined magnitude to the injector during a predetermined pre-energizing time to prevent the flow rate of the fuel from being generated, before the main injection of injecting the target injection amount as described later.

Figure 2:
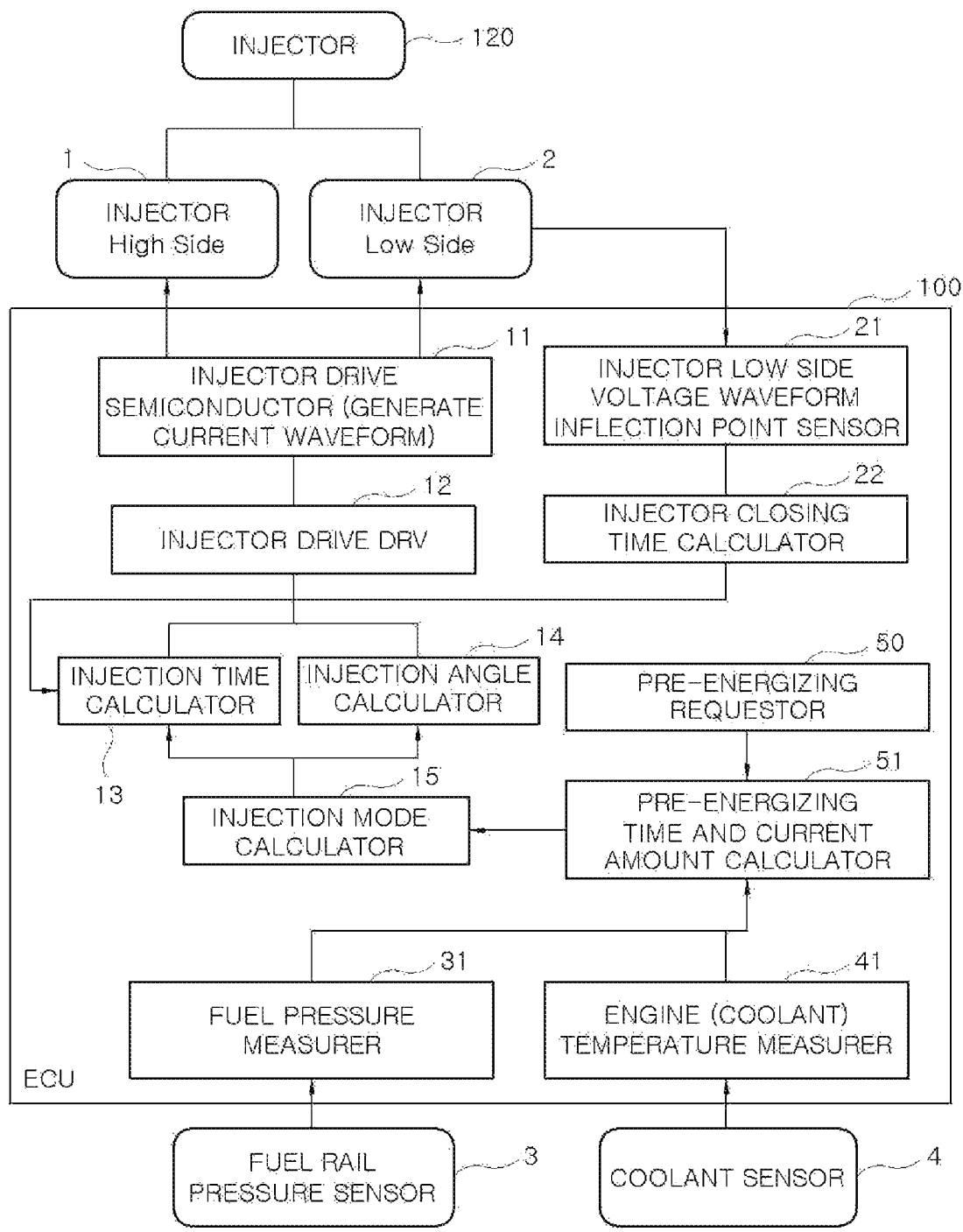
FIG. 2 is a block diagram illustrating a configuration of a fuel injection control apparatus according to an exemplary embodiment of the present invention.

FIG. 2 is a block diagram illustrating a configuration of a fuel injection control apparatus according to an exemplary embodiment of the present invention.

As illustrated in FIG. 2, a fuel injection control apparatus according to an exemplary embodiment of the present invention includes an injector 120 which injects fuel into a cylinder, and a controller 100 which controls the injector 120 so that the fuel is injected from the injector by the target injection amount. The controller 100 is connected to a high side 1 and a low side 2 of the injector 120, respectively, for driving the injector 120.

An injector drive semiconductor 11 which is connected to the high side 1 and the low side 2 of the injector 120, respectively receives a drive command signal from an injector drive driver 12 to generate a current waveform upon the pre-energizing and the main injection and apply the pulse thereby to the high side 1 and the low side 2 of the injector 120, driving the injector 120.

Figure 6:
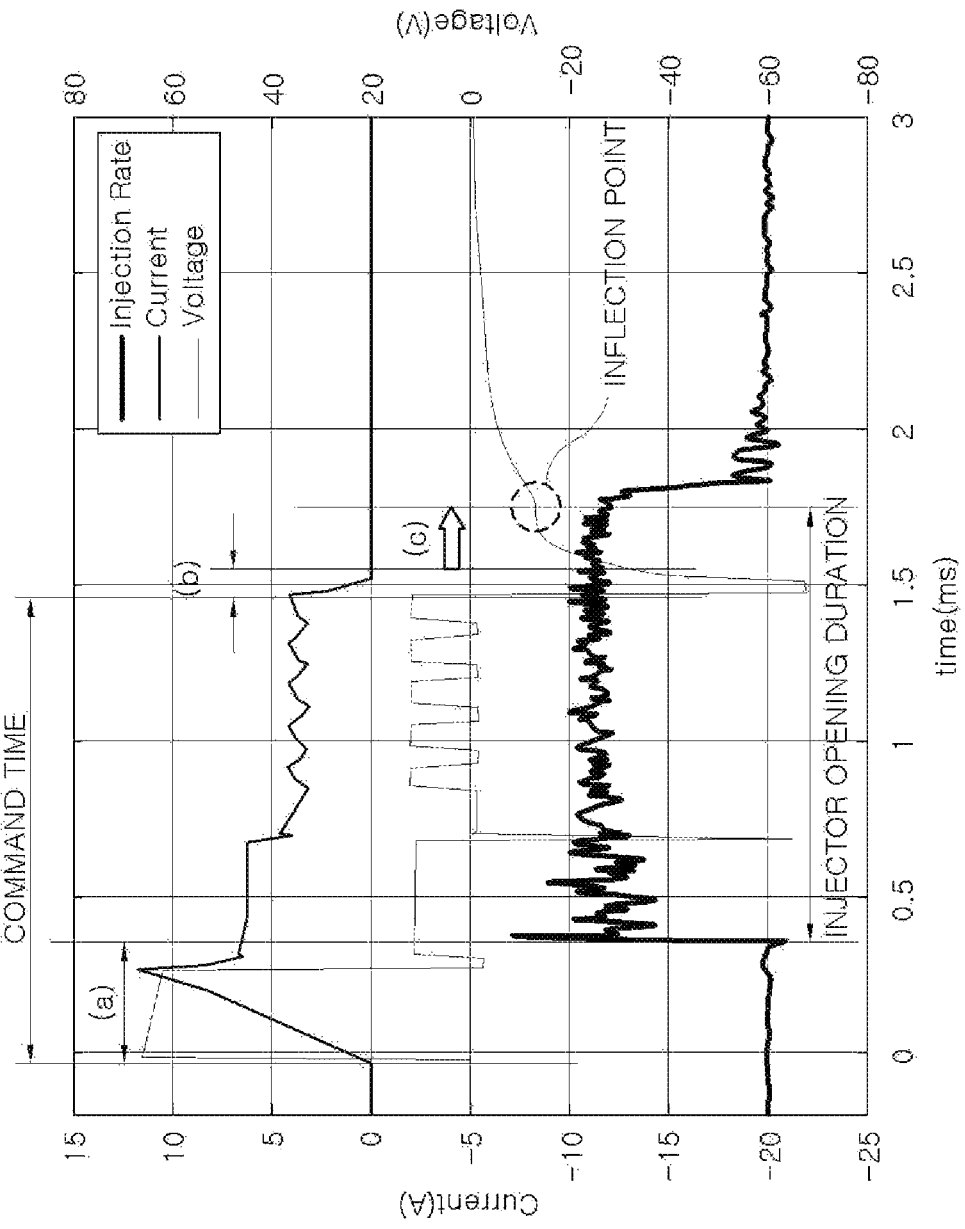
FIG. 6 is a graph illustrating the relationship between an injector opening duration, which is a duration during which the actual fuel is injected from the injector, a current applied to the injector, and a voltage generated from the injector.

Meanwhile, when the injection by the injector 120 is terminated, only the low side is activated so that the counter electromotive force from the injector 120 flows to the low side thereof. Accordingly, an injector low side voltage waveform inflection point sensor 21 of the controller 100 receives the voltage signal of the counter electromotive force from the low side 2 of the injector 120 to generate a voltage waveform, and detects the inflection point of the voltage waveform illustrated in FIG. 6.

An injector closing time calculator 22 determines the closing time of the injector 120 based on the location of the inflection point which is detected by the injector low side voltage waveform inflection point sensor 21.

A pre-energizing requestor 50 transmits a pre-energizing request signal for allowing the drive current having a predetermined magnitude during a predetermined drive time to be applied to the injector 120 to magnetize a coil 120d of the injector 120 in advance, before the main injection for injecting the target injection amount, when it is necessary to reduce the deviation of the opening time of the injector 120. As the condition requiring the pre-energizing of the injector, there may be a case where a high pressure pump 140 is operated normally, and the main injection injects the fuel of the low flow rate corresponding to the ballistic section, rather than a forced low pressure injection mode by a limp home mode.

A pre-energizing time and current amount calculator 51 receives the pre-energizing request signal from the pre-energizing requestor 50 to determine the pre-energizing time required for the pre-energizing and the amount of the current applied to the injector.

Figure 5:
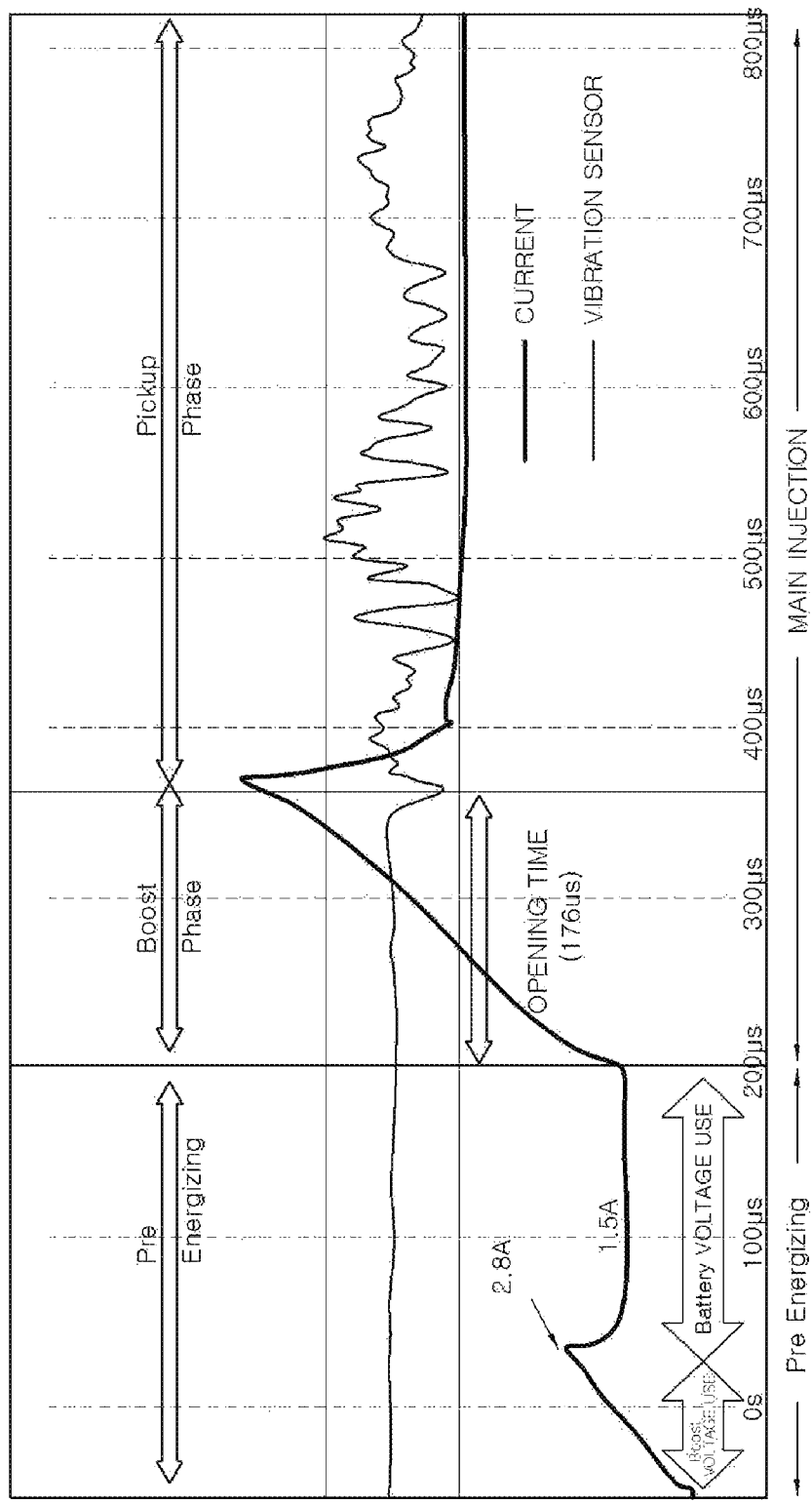
FIG. 5 is a diagram illustrating drive waveforms of the injector when the fuel injection control method according to an exemplary embodiment of the present invention is performed.

The target injection amount is injected into the combustion chamber of the engine 110 through the main injection after pre-energizing the injector, and the pre-energizing of the injector is not intended for supplying fuel, but is for magnetizing the coil 120e of the injector 120 in advance before the main injection to reduce the time required for magnetizing the coil 120e upon the main injection, rapidly opening the injector 120. Accordingly, as also illustrated in FIG. 5, the supply time of the control current supplied to the injector 120 upon the pre-injection is limited within a range in which the flow rate of the actual injection fuel is not generated. At the instant time, the representative value of the maximum pre-energizing time may be defined by use of the injector having the fastest opening of the injector measured from a flowmeter among a plurality of injectors as a representative sample.

Like the pre-energizing time, the amount of the current applied to the injector upon the pre-energizing is limited within a range configured for sufficiently magnetizing the coil 120e within a range in which the flow rate of the actual injection fuel is not generated.

The pre-energizing time and current amount calculator 51 determines the pre-energizing time and the amount of current through the fuel pressure and the temperature of the engine, which are received through a fuel rail pressure sensor 3 and fuel pressure measurer 31 and a coolant sensor 4 and an engine temperature measurer 41. For example, as the fuel pressure is higher than a predetermined value, the pre-energizing time needs to be increased, and the amount of current is also increased.

The pre-energizing time and the amount of current are stored in advance in the controller 100 in a form of a two-dimensional table related to the engine temperature and the fuel pressure, and may be determined by use of the fuel pressure and the engine temperature, which are measured from the fuel rail pressure sensor 3 and the coolant sensor 4, and the stored table.

An injection mode calculator 15 includes an injection time calculator 13 and an injection angle calculator 14 to determine the number of injection times (single injection or multi-phase injection), an injection time (supply time of the current applied to the injector), and an injection angle (the time point at which the current is applied to the injector), and to transmit the determined result to the injector drive driver 12. The injection mode calculator 15 determines the target injection amount which may satisfy a target air-to-fuel ratio, and accordingly, determines the number of injection times, the injection time, and the injection time point upon the main injection. Furthermore, the injection mode calculator 15 receives information on the pre-energizing time determined by pre-energizing time and current amount calculator 51 to determine the injection time of the injector upon a final injection control including the pre-energizing.

The injector drive driver 12 generates a drive signal by use of the information related to the number of injection times, the injection time, and the injection angle determined by the injection mode calculator 15, and transmits the drive signal to the injector drive semiconductor 11.

Furthermore, the injector drive semiconductor 11 forms a current waveform upon the pre-energizing and the main injection based on the drive signal. FIG. 5 illustrates a current waveform generated by the injector drive semiconductor 11 upon the fuel injection control according to an exemplary embodiment of the present invention.

As described above, the current waveform upon the main injection includes a Boost Phase, a Pickup Phase, and a Hold Phase. The time point at which the injector is fully opened is placed at the beginning of the Pickup Phase in the latter half of the Boost Phase of the main injection. In the example of FIG. 5, an opening time point of the injector is estimated by attaching a vibration sensor to the injector to perform a test. The first strong vibration measured from the vibration sensor is a vibration generated when the needle of the injector hits a stopper strongly, and the occurrence time point of the vibration may be indirectly estimated as the time point at which the injector is fully opened. In the example of FIG. 5, it is estimated that the injector is opened approximately 176 μs time point from the start time point of the main injection.

In the example of FIG. 5, unlike the current waveform of the conventional injector, there is a Pre-energizing Phase before the main injection. The current waveform at the Pre-energizing Phase is similar to the current waveform upon the main injection of the conventional injector. That is, the Pre-energizing Phase also includes a phase of using a boost voltage, and a phase of using a battery voltage. In the example of FIG. 5, the amount of current is increased to 2.8 A by use of the boost voltage, and then the current value is maintained at 1.5 A by use of the battery voltage until the start time point of the main injection. As illustrated in FIG. 5, unlike the main injection phase, no strong vibration is detected in the Pre-energizing Phase. That is, the Pre-energizing Phase is a phase for magnetizing the coil of the injector, rather than supplying the fuel, and in the Pre-energizing Phase, the injector is not opened, and accordingly, the flow rate of the fuel is not generated.

The controller 100 may be implemented in a form of a computer provided in the vehicle. In that case, the controller 100 may be implemented by recording a program for implementing the present control function on a computer-readable recording medium, and reading and executing the program recorded on the present recording medium in a computer system. Furthermore, the "computer system" used here is a computer system built in the vehicle, and includes hardware, such as an OS or a peripheral device. The "computer readable recording medium" refers to a memory device such as a portable medium such as a flexible disk, an optical magnetic disk, a ROM, or a CD-ROM, or a hard disk built into a computer system. Furthermore, the "computer readable recording medium" may also include one which dynamically maintains a program for a short time, such as a communication line when transmitting a program through a network such as the Internet or a communication line such as a telephone line, or one which maintains the program during a certain time, such as a volatile memory inside the computer system which becomes a server or a client in that case. The program may be one which may implement a portion of the aforementioned functions, or one which may implement the aforementioned functions in combination with a program previously recorded in the computer system.

Furthermore, some or all models of the controller 100 in the aforementioned embodiments may be implemented as an integrated circuit such as a Large Scale Integration (LSI). Each model of the controller 100 may become individually processorization, and may also become processorization by integrating some or all models of the controllers 100. Furthermore, the method of producing the integrated circuit is not limited to the LSI, but may be implemented by a dedicated circuit or a general purpose processor. Furthermore, when the technology of producing the integrated circuit which replaces the LSI appears to be with the advance of a semiconductor technology, the integrated circuit according to the said technology may be used.

Figure 3A:
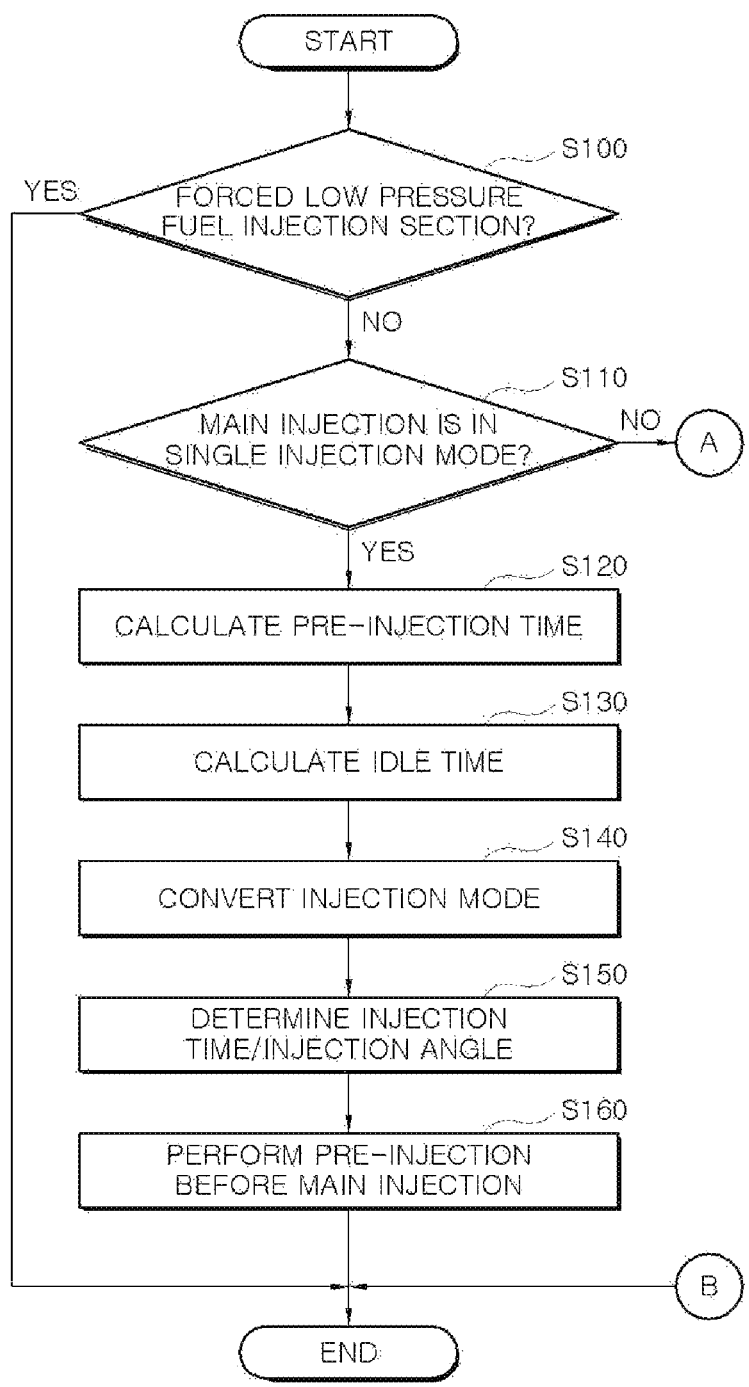
FIG. 3A and FIG. 3B are flowcharts illustrating the fuel injection control method according to an exemplary embodiment of the present invention.
Figure 3B:
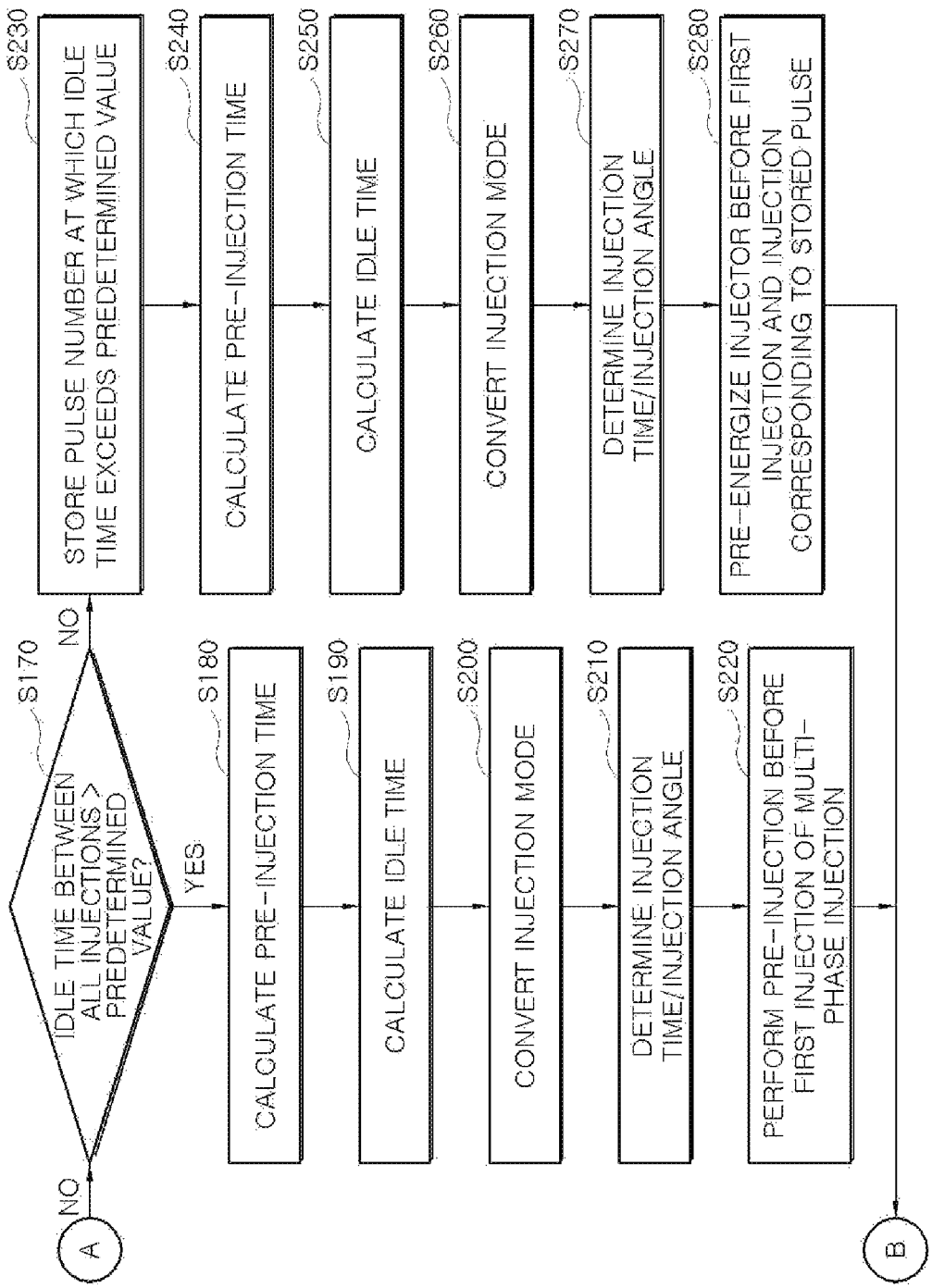

FIG. 3 is a flowchart illustrating a fuel injection control method according to an exemplary embodiment of the present invention, which is performed by the fuel injection control apparatus illustrated in FIG. 2.

According to FIG. 3, the pre-energizing requestor 50 of the controller 100 determines whether the current fuel injection section corresponds to the forced low pressure fuel injection section in the limp home mode (S100). To perform the pre-injection before the main injection, the high pressure fuel pump 140 basically needs to be operated normally. Accordingly, first, the pre-energizing requestor 50 determines whether the current fuel injection section corresponds to the forced low pressure fuel injection section due to the malfunction of the high pressure fuel pump 140, and performs the pre-energizing logic to be described later when the high pressure fuel pump 140 is normally operated.

When the high pressure fuel pump 140 is in normal operation, and the pre-energizing requestor 50 transmits a pre-energizing request signal because it is necessary to pre-energize the injector to reduce the deviation of the opening time for each injector, the injection mode calculator 15 determines whether the injection mode upon the existing main injection is a single injection mode or a multi-phase injection mode (S110).

When it is determined that the main injection is in the single injection mode, the pre-energizing time and current amount calculator 51 of the controller 100 determines the pre-energizing time which is a time to apply the current to the injector 120 upon the pre-energizing (S120). As described above, the pre-energizing time is a time within a range in which the flow rate of the actual fuel is not generated, and may be determined through the currently measured fuel pressure and engine temperature and a table stored in the controller 100.

Furthermore, the pre-energizing time and current amount calculator 51 of the controller 100 determines the amount of the current applied to the injector upon the pre-energizing (S130). As described above, the amount of current is a value within a range in which the flow rate of the actual fuel is not generated, and may be determined through the currently measured fuel pressure and engine temperature and a table stored in the controller 100.

When the pre-energizing time and the amount of current are determined by the pre-energizing time and current amount calculator 51, the injection mode calculator 15 converts the final injection time including the pre-energizing to a time obtained by summing the injection time of the existing main injection and the pre-energizing time determined in step S120 (S140).

The current value and the injection time information determined by the injection mode calculator 15 are delivered to the injector drive driver 12, and the injector drive driver 12 transmits a drive signal to the injector drive semiconductor 11 by use of the corresponding information. The injector drive semiconductor 11 forms a current waveform for pre-energizing the injector in some sections of the total injection time, based on the drive signal received from the injector drive driver 12, and forms a current waveform for the main injection in the remaining sections (S150). At the instant time, the current waveform upon the main injection is set to the current waveform upon the main injection for satisfying the existing target injection amount.

As a result, the injector is pre-energized during the pre-energizing time, and the main injection for injecting the target injection amount is performed following the pre-energizing of the injector (S160).

Meanwhile, when it is determined in step S110 that the existing main injection is in the multi-phase injection mode (S130: No), the injection mode calculator 15 determines whether the idle time between all the injections in the multi-phase injection has exceeded a predetermined value (S170). When the idle time between the injections is short, the magnetization of the coil 120e generated by the immediately preceding injection is all not lost yet, not requiring to pre-energize the injector. On the other hand, when the idle time is longer than the time (predetermined value) at which magnetization remains in the coil 120e, it is necessary to pre-energize the injector before the corresponding injection. Accordingly, the injection requiring the pre-injection is determined by comparing the idle time between the plurality of injections configuring the multi-phase injection with the predetermined value. Preferably, for the determination, the time until the magnetization is fully removed after a specific injection time (for example, 0.5 ms, 1 ms, 2 ms, 5 ms, or the like) in the injector sample with the earliest opening time is stored in the controller 100 in a separate calibration table as a predetermined value.

If it is determined in step S170 that the idle time between the injections is the predetermined value or less in all the injections of the multi-phase injection, it is not necessary to pre-energize the injector during the multi-stage injection. Accordingly, in the instant case, the coil 120e may be magnetized before a first injection by pre-energizing the injector only before the first injection of the multi-phase injection.

To this end, the injection mode calculator 15 determines the pre-energizing time and the amount of current, as in the previous steps S120 and S130 (S180, S190).

Furthermore, the injection mode calculator 15 converts the injection time (S200). That is, the injection time of the first injection in the existing multi-phase injection mode is set to a value obtained by summing the pre-energizing time determined in step S180 and the injection time of the existing first injection. Furthermore, the existing injection time is applied to the remaining injections of the multi-phase injection as it is except for the first injection. Furthermore, the existing injection angle is applied to the injection angle of the multi-phase injection upon the main injection as it is.

Furthermore, when the injection time and the injection angle of each injection are determined by the injection mode calculator 15, the injector drive driver 12 generates a drive signal by use of information related to the number of injection times, the injection time, and the injection angle, which are determined by the injection mode calculator 15, and transmits the drive signal to the injector drive semiconductor 11. With respect to the first injection of the multi-phase injection based on the drive signal received from the injector drive driver 12, the injector drive semiconductor 11 forms a current waveform for pre-energizing the injector in some sections of the injection time of the first injection, and forms a current waveform for the main injection in the remaining sections (S150). At the instant time, the current waveform of each of the multi-phase injection upon the main injection is set to the current waveform upon the main injection for satisfying the existing target injection amount.

As a result, the injector 120 is driven to be pre-energized before the first injection of the existing n-stage injection (S220).

In step S170, when it is determined that the idle time exceeds a predetermined value in at least any one of the injections upon the existing multi-phase injection (S170: No), the injection mode calculator 15 stores all the pulse numbers of the injections at which the idle time from the immediately preceding injection exceeds the predetermined value (S230). This is because the magnetization of the coil 120e has disappeared by the immediately preceding injection in the case of the injection of the corresponding pulse number, such that it is necessary to magnetize the coil again by performing the pre-injection immediately before the magnetization disappears. For example, when the existing main injection is a five-stage injection, and the idle time between the first phase and the second phase among them and the idle time between the fourth phase and the fifth phase exceed the predetermined value, the pulse numbers upon the second phase injection and the fifth phase injection are stored in the controller 100.

Next, the injection mode calculator 15 determines the pre-energizing time and the amount of current, in the same manner as in steps S120, S130, S180, and S190 (S240, S250).

Furthermore, the injection mode calculator 15 converts the injection time (S260). For the injection times of the first injection (first phase injection) among the multi-phase injection and the injection corresponding to the pulse number stored in step S230, values obtained by summing the pre-energizing time determined in step S240 and the existing injection time are set as new injection times. For example, in the aforementioned example, values obtained by summing the injection times of the first phase, second phase, and fifth phase injections and the pre-energizing time determined in step S240 for each of the injection times of the existing first phase, second phase, and fifth phase injections are set to new injection times of the first phase, second phase, and fifth phase injections, respectively. Furthermore, the existing injection times are applied to the remaining injections as they are. For example, in the aforementioned example, the existing injection times upon the respective third phase and fourth phase injections are applied to the third phase and fourth phase injections except for the first phase, second phase, and fifth phase injections as they are. Furthermore, the existing injection angle is applied to the injection angle of the multi-phase injection upon the main injection as it is.

Furthermore, when the injection time and the injection angle of each injection are determined by the injection mode calculator 15, the injector drive driver 12 generates a drive signal by use of information related to the number of injection times, the injection time, and the injection angle, which are determined by the injection mode calculator 15, and transmits the drive signal to the injector drive semiconductor 11. The injector drive semiconductor 11 generates a current waveform upon the pre-energizing and the main injection, based on the drive signal received from the injector drive driver 12 (S270). At the instant time, the injector drive semiconductor 11 forms a current waveform for pre-energizing the injector in some sections of the injection time of the first injection, and forms a current waveform for the main injection in the remaining sections. Furthermore, the injector drive semiconductor 11 determines whether each pulse number of the multi-phase injection corresponds to the pulse number stored in step S230 with respect to the remaining multi-phase injections except for the first phase, and likewise, with respect to the injections corresponding to the stored pulse numbers, forms a current waveform for pre-energizing the injector in some sections, and forms a current waveform for the main injection in the remaining sections.

Figure 4:
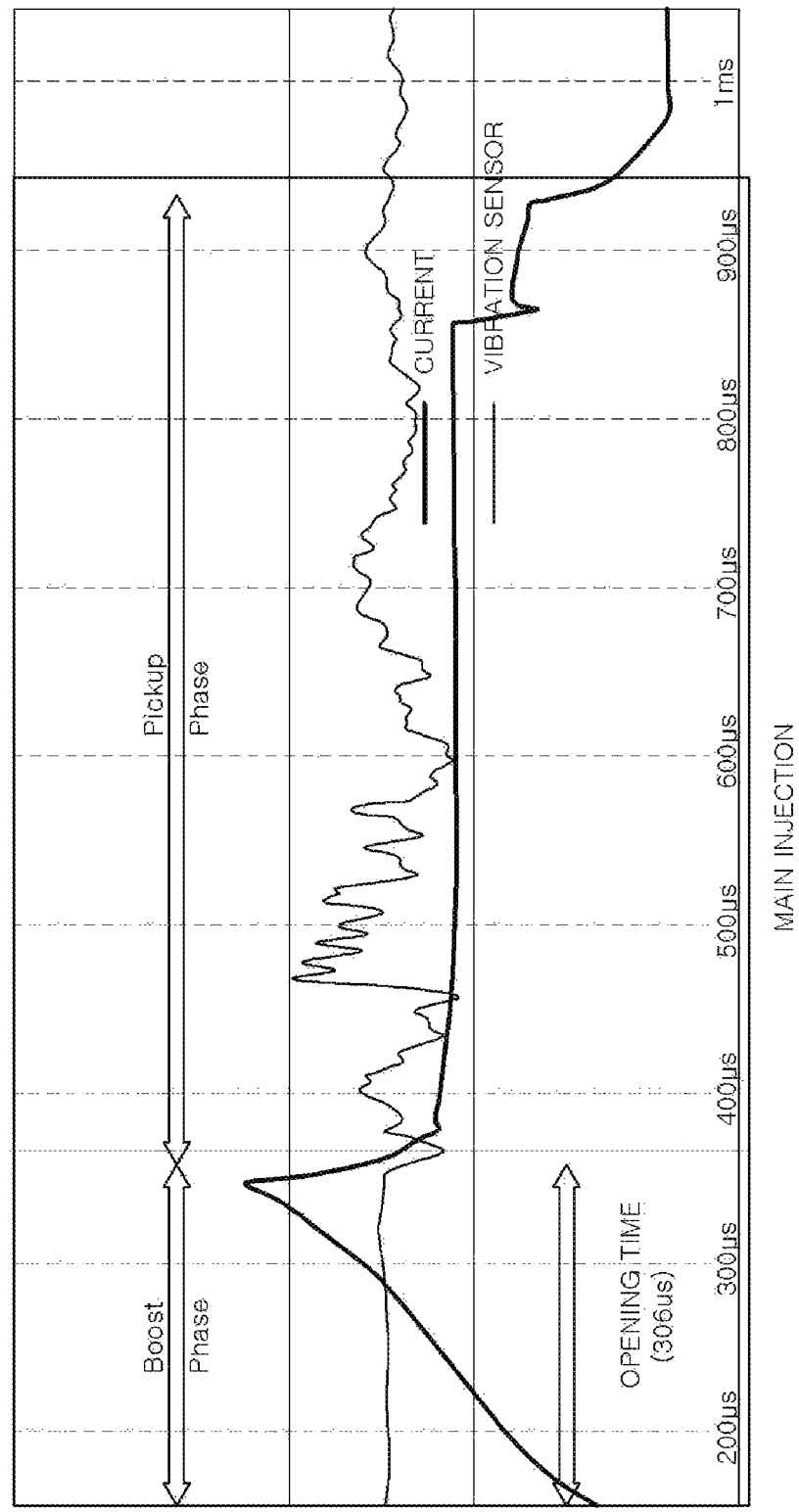
FIG. 4 is a diagram illustrating drive waveforms of an injector which is mounted to a conventional GDI engine.

As may be seen from the results illustrated in FIG. 4 and FIG. 5, according to the fuel injection control method according to the exemplary embodiment of the present invention, it is possible to significantly reduce the injector opening time. According to the conventional fuel injection control method illustrated in FIG. 4, the injector opening time estimated by the measurement result from the vibration sensor is approximately 306 µs. In contrast, according to the fuel injection control method according to the exemplary embodiment of the present invention illustrated in FIG. 5, the injector opening time estimated by the measurement result from the vibration sensor is approximately 176 µs, and it is possible to shorten the injector opening time almost two times as long as the conventional one.

Figure 7:
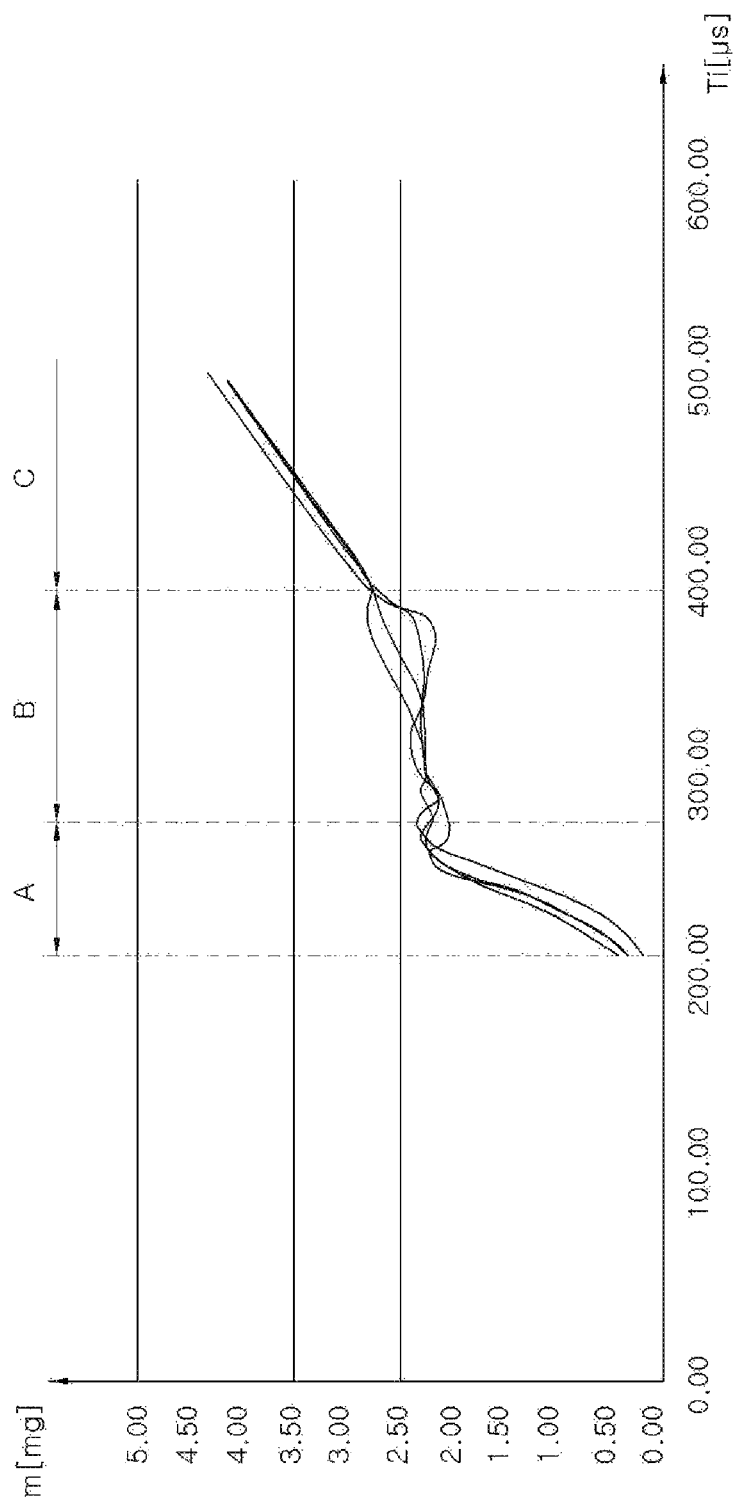
FIG. 7 is a graph illustrating the change in a fuel amount (m) based on an injector operating time ($T_i$) for each section.
Figure 8:
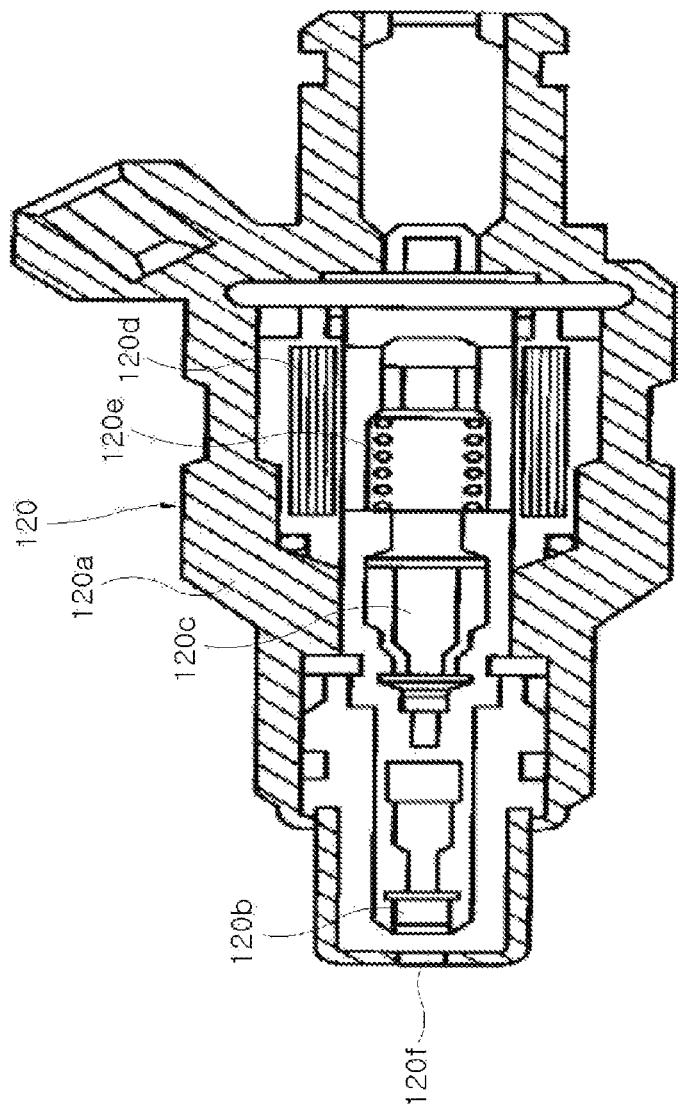
FIG. 8 is a cross-sectional diagram illustrating a configuration of the injector.

Accordingly, it is possible to rapidly reach a linear section (C) by passing through a ballistic section (A) and a transient section (B) (very small flow rate section) illustrated in FIG. 7 within a short time. Accordingly, according to an exemplary embodiment of the present invention, it is possible to stably generate the flow rate even when the injection time is short, and it is possible to stably form the flow rate even in the ballistic section. Furthermore, it is possible to constantly maintain the injector opening time regardless of the length of the injection time, and it is also possible to substantially improve the deviation of the opening time between the injectors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel injection control method of injecting fuel to a combustion chamber of an engine through an injector, the method comprising:
   pre-energizing, by a controller, to drive the injector during a predetermined pre-energizing time; and
   performing, by the controller, a main injection in which the injector is controlled by the controller to inject the fuel into the combustion chamber by a target injection amount, after the pre-energizing of the injector,
   wherein the pre-energizing is configured to magnetize an injector coil of the injector in advance by applying an amount of current preventing a flow rate of the fuel from being generated by the pre-energizing, to the injector during the predetermined pre-energizing time.

2. The method of claim 1,
   wherein the pre-energizing further includes determining the predetermined pre-energizing time and the amount of the current according to a fuel pressure and an engine temperature.

3. The method of claim 2, wherein the pre-energizing further includes:
   determining, by the controller, whether the main injection is a single injection or a multi-phase injection.

4. The method of claim 3, further including:
   converting, by the controller, a final injection time to a time obtained by summing an injection time of a present main injection and the predetermined pre-energizing time, when the main injection is determined as the single injection.

5. The method of claim 3, further including:
   when the main injection is determined as the multi-phase injection, determining, by the controller, whether idle times between injections of the multi-phase injection exceed a predetermined value, and
   when all of the idle times between the injections of the multi-phase injection are equal to or less than the predetermined value, converting, by the controller, the injection time upon a first injection of the multi-phase injection to a time obtained by summing an injection time of the first injection upon a present multi-phase injection and the predetermined pre-energizing time.

6. The method of claim 5, further including:
   when at least one of the idle times between the injections of the multi-phase injection is greater than the predetermined value, converting, by the controller, an injection time of a corresponding injection to a time obtained by summing a present injection time upon the corresponding injection and the predetermined pre-energizing time, in every first injection of the multi-phase injection and every injection after the at least one of the idle times, which is greater than the predetermined value.

7. The method of claim 1, further including:
   determining, by the controller, whether a limp home mode, in which the fuel is injected into the combustion chamber in a forced low pressure mode, is being executed due to malfunction of a pump of a fuel system; and
   stopping, by the controller, the pre-energizing, when the controller determines that the limp home mode is being executed.

8. The method of claim 1,
   wherein the pre-energizing is configured to increase the amount of the current applied to the injector by use of a boost voltage, upon the pre-energizing of the injector, and then to maintain the amount of the current applied to the injector up to a time point of the main injection by use of a battery voltage.

9. A fuel injection control apparatus comprising:
   an injector which injects fuel to a cylinder; and
   a controller which is electrically-connected to the injector and configured to control the injector so that the fuel is injected from the injector into the cylinder by a target injection amount,
   wherein the controller is configured to perform a pre-energizing control in which an injector coil of the injector is magnetized by applying an amount of current having a predetermined magnitude to the injector during a predetermined pre-energizing time to prevent a flow rate of the fuel from being generated, before a main injection in which the target injection amount of the fuel is injected into the cylinder.

10. The fuel injection control apparatus of claim 9, wherein the controller includes:
    a pre-energizing time and current amount calculator which is configured to determine the predetermined pre-energizing time and the amount of the current;
    an injection mode calculator which is configured to determine an injection time of the injector according to a number of injection times, an injection time and an injection angle of the injector upon the main injection, and a result determined by the predetermined pre-energizing time and current amount calculator; and
    an injector drive semiconductor which is configured to control the injector by forming current waveforms upon the pre-energizing control and the main injection, respectively, according to a result determined by the injection mode calculator.

11. The fuel injection control apparatus of claim 10, wherein the predetermined pre-energizing time and current amount calculator is configured to determine the predetermined pre-energizing time and the amount of the current according to a fuel pressure measured by a fuel rail pressure sensor and an engine temperature measured by a coolant sensor.

12. The fuel injection control apparatus of claim 9, wherein the pre-energizing control further includes determining the predetermined pre-energizing time and the amount of the current according to a fuel pressure and an engine temperature.

13. The fuel injection control apparatus of claim 12, wherein the pre-energizing control further includes determining, by the controller, whether the main injection is a single injection or a multi-phase injection.

14. The fuel injection control apparatus of claim 13, wherein the pre-energizing control further includes:
   converting, by the controller, a final injection time to a time obtained by summing an injection time of a present main injection and the predetermined pre-energizing time, when the main injection is determined as the single injection.

15. The fuel injection control apparatus of claim 13, wherein the pre-energizing control further includes:
   when the main injection is determined as the multi-phase injection, determining, by the controller, whether idle times between injections of the multi-phase injection exceed a predetermined value, and
   when all of the idle times between the injections of the multi-phase injection are equal to or less than the predetermined value, converting, by the controller, an injection time upon a first injection of the multi-phase injection to a time obtained by summing an injection time of the first injection upon a present multi-phase injection and the predetermined pre-energizing time.

16. The fuel injection control apparatus of claim 15, further including:
   when at least one of the idle times between the injections of the multi-phase injection is greater than the predetermined value, converting, by the controller, an injection time of a corresponding injection to a time obtained by summing a present injection time upon the corresponding injection and the predetermined pre-energizing time, in every first injection of the multi-phase injection and every injection after the at least one of the idle times, which is greater than the predetermined value.

17. The fuel injection control apparatus of claim 9, further including:
   determining, by the controller, whether a limp home mode, in which the fuel is injected into the cylinder in a forced low pressure mode, is being executed due to malfunction of a pump of a fuel system; and
   stopping, by the controller, the pre-energizing control, when the controller determines that the limp home mode is being executed.

18. The fuel injection control apparatus of claim 9, wherein the pre-energizing control is configured to increase the amount of the current applied to the injector by use of a boost voltage, upon pre-energizing of the injector, and then to maintain the amount of the current applied to the injector up to a time point of the main injection by use of a battery voltage.

* * * * *